(12) United States Patent
Kattner et al.

(10) Patent No.: US 9,099,728 B2
(45) Date of Patent: Aug. 4, 2015

(54) CARRYING CONTAINER FOR A POWER SUPPLY UNIT WITH FUEL CELLS

(75) Inventors: Ulrich Kattner, Ulm (DE); Siegfried Limmer, Nurtingen (DE)

(73) Assignee: HELIOCENTRIS FUEL CELL SOLUTIONS GMBH, Wendlingen am Neckar (DE)

( * ) Notice: Subject to any disclaimer, the term of this patent is extended or adjusted under 35 U.S.C. 154(b) by 1209 days.

(21) Appl. No.: 12/445,286

(22) PCT Filed: Oct. 12, 2007

(86) PCT No.: PCT/EP2007/060882
§ 371 (c)(1),
(2), (4) Date: Apr. 11, 2009

(87) PCT Pub. No.: WO2008/043838
PCT Pub. Date: Apr. 17, 2008

(65) Prior Publication Data
US 2010/0028752 A1    Feb. 4, 2010

(30) Foreign Application Priority Data
Oct. 13, 2006   (DE) .......................... 10 2006 049 031

(51) Int. Cl.
*H01M 8/24* (2006.01)
*H01M 8/04* (2006.01)
*H01M 8/10* (2006.01)

(52) U.S. Cl.
CPC ........ *H01M 8/2475* (2013.01); *H01M 8/04201* (2013.01); *H01M 8/2485* (2013.01); *H01M 8/04067* (2013.01); *H01M 8/04089* (2013.01); *H01M 2008/1095* (2013.01);
(Continued)

(58) Field of Classification Search
CPC . H01M 2/00; H01M 2250/00; H01M 8/2475; H01M 8/24; H01M 8/0467; H01M 8/04201; H01M 8/2485; H01M 2250/30; Y02E 60/50; Y02B 90/18
USPC .......... 428/68, 69, 71, 72, 76; 429/34, 48, 57, 429/65, 121, 122, 123, 151, 159, 163, 164, 429/167, 175, 177, 400; 521/50
See application file for complete search history.

(56) References Cited

U.S. PATENT DOCUMENTS 3,692,585 A * 9/1972 Mayo .............................. 429/408
4,061,817 A * 12/1977 Maxel ........................... 442/268
(Continued)

FOREIGN PATENT DOCUMENTS

EP       0546211 A1   6/1993
EP       0649570 B1   2/1999
(Continued)

OTHER PUBLICATIONS

The Random House College Dictionary Revised ed. (ed. J. Stein 1980 New York p. 1186 col. 1 def. 6).*
(Continued)

*Primary Examiner* — Patrick Ryan
*Assistant Examiner* — Aaron Greso
(74) *Attorney, Agent, or Firm* — Maier & Maier, PLLC

(57) ABSTRACT

The invention presents a possible way of converting power supply units, in particular compact power supply units, which are critical for safety into stable, impact-resistant fuel cell units by using expanding plastic.

19 Claims, 3 Drawing Sheets

Figure 1:
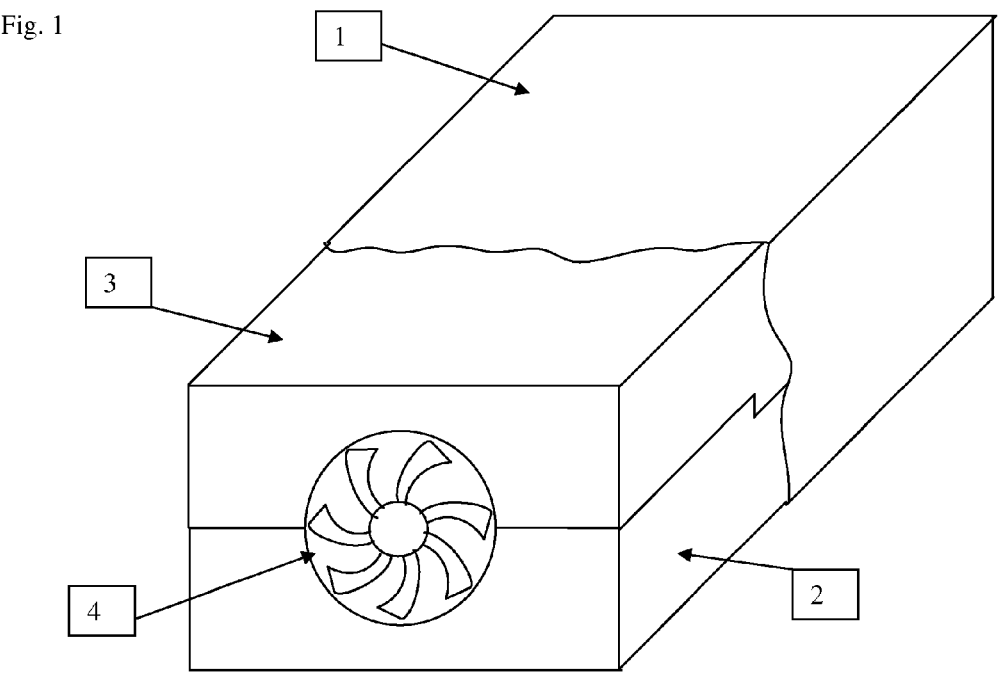

(52) U.S. Cl.
CPC ............ *H01M 2250/30* (2013.01); *Y02B 90/18* (2013.01); *Y02E 60/50* (2013.01)

(56) References Cited

U.S. PATENT DOCUMENTS

| | | | | |
|---|---|---|---|---|
| 4,468,913 | A * | 9/1984 | Guillon et al. | 53/440 |
| 5,980,726 | A * | 11/1999 | Moulthrop et al. | 205/637 |
| 7,147,950 | B2 * | 12/2006 | Yonetsu et al. | 429/447 |
| 2003/0070850 | A1 | 4/2003 | Reid et al. | |
| 2004/0072052 | A1 * | 4/2004 | Yamamoto et al. | 429/34 |
| 2004/0209151 | A1 * | 10/2004 | Hase et al. | 429/38 |
| 2005/0095500 | A1 | 5/2005 | Corless et al. | |
| 2005/0202292 | A1 * | 9/2005 | Richards et al. | 429/22 |
| 2005/0211436 | A1 | 9/2005 | Fripp et al. | |
| 2005/0269234 | A1 * | 12/2005 | Gore et al. | 206/524 |
| 2006/0029848 | A1 * | 2/2006 | Kaye et al. | 429/25 |

FOREIGN PATENT DOCUMENTS

| | | | | |
|---|---|---|---|---|
| EP | 1339120 | A2 | 8/2003 | |
| GB | 1587748 | * | 4/1981 | ............ H01M 2/40 |
| JP | 2003-217615 | * | 7/2003 | ............ H01M 8/02 |
| WO | WO9402966 | | 2/1994 | |

OTHER PUBLICATIONS

Hole Mcmillan Dictionary Hole Entry online May 17, 2013.pdf {http://macmillandictionary.com/us/thesaurus/american/hole}.*

* cited by examiner

CARRYING CONTAINER FOR A POWER SUPPLY UNIT WITH FUEL CELLS

The present invention relates to a carrying container for a power supply unit, which draws at least some of its power from a fuel cell stack, in particular a fuel cell stack with polymer electrolyte membrane fuel cells. The invention additionally describes a suitable use of a carrying container according to the invention, and the use of the carrying container for reducing hazards of power supply units according to the invention.

There are different configurations and types of fuel cells. A widely used type of fuel cell is the polymer electrolyte membrane fuel cell, which carries out the conversion of the reactants, in particular hydrogen and oxygen, with an electrolyte in the form of a polymer membrane, in one layer which is adjacent to the membrane. In the process electrical power, among other things, is produced. Other types of fuel cell, in particular in the low temperature range to approx. 200° C. or 250° C., in particular with a locally secure or fixed electrolyte, are likewise known. The fuel cell stacks are assembled to form power supply units with further peripheral components such as valves, sensors, control units, reactant storage volumes, blowers and electrical power stores (support batteries, ultracapacitors). The compact power supply units, that is, those power supply units which can supply 10 kW of power, in particular less than 5 kW of power, can be particularly well built with polymer electrolyte membrane fuel cells. The compact power supply units can often be taken along to locations where electrical power must be particularly ensured as portable units in the leisure field such as in the motor boat sport field, or else in the safety-critical field, for example as emergency power supply units. Compact units can therefore often be designed in such a manner that they can be carried by one person. A further application of fuel cell units according to the invention consists in being installed at a fixed location as a boat drive or auxiliary boat drive. Emergency power units are also often placed at a fixed location.

The polymer electrolyte membrane fuel cell operates directly with hydrogen, according to one configuration. In the mind of many users, hydrogen is a safety risk. An ignitable mixture of oxygen and hydrogen can form, in particular with the oxygen from the air. In order to anticipate a hazard to a user, compact power supply units are known, which are equipped with at least one hydrogen sensor, often a plurality of hydrogen sensors, in order to detect escaped hydrogen and to be able to trigger countermeasures in good time. In such units, the individual components which produce the compact power supply unit are mounted on a frame. A particular knowledge lies in the identification of suitable points at which to place hydrogen sensors. After construction, proof is to be given to relevant inspection associations that the power supply unit is reliable and safe.

FIG. 9 of EP 1 339 120 A2 shows a housing with a fuel cell which is spaced between the individual cells and has a fan for conveying air on the output side. The housing has a cavity which is partially filled by the fuel cell and is otherwise meant for ambient air to flow through.

FIGS. 8, 10 and 11 of EP 0 649 570 B1 show spacers and bars which can be produced from heat-conducting plastics. The spacers and bars are to be inserted between the individual levels of cells of a multi-cell electrochemical power converter in order thus to create a stack.

There is therefore a desire for a carrying container which not only simplifies the assembly of the individual components of the power supply unit, but also allows proof of safety to be produced by means of few checks without additional comprehensive proof.

A description for creating a packing unit for individual components of a computer is disclosed in the patent family with the following patent family members, among others: DE 691 03 014, EP 546 211 B2, JP 2003 05 16 84 A. In this patent family it is proposed that an expanded plastic be used as a holding material for individual components of a computer such as the hard disk.

With knowledge of the teaching disclosed there, the approach can according to the invention be developed further in order to create a carrying container for a compact power supply unit.

The object is achieved by a carrying container of the invention. A suitable use for a carrying container according to the invention can be found. The use of the carrying container for reducing hazards can be found. Advantageous developments can be found in the dependent claims.

The carrying container consists of individual components. The carrying container has cut-outs. Individual components of the power supply unit can be placed in the cut-outs. The individual components of the power supply unit can lie in the carrying container cut-outs without any further fastening measures, for example clamping elements. The carrying container is constructed from the individual layers of its components. An expanded plastic has proven a suitable material for the carrying container. An expanded plastic of this type can be polypropylene, polyurethane or polyethylene. The components of the power supply unit are connected to each other, for example by means of cables, tubing, etc. The carrying container fills out most of the space of the power supply unit. The components of the power supply unit together with the layers of the carrying container form a compact unit. The compact unit looks like a cube. The power supply unit is an elongate, rectangular unit whose essential formative means is the carrying container. Other suitable forms are likewise conceivable.

Expanded plastic is known as an insulating material or foam. Expanded plastic has a low density and a low thermal conductivity factor. The expanded plastic is a foamed plastic. The foamed plastic has inclusions and cavities. The inclusions can be small air pockets. The inclusions can be spherical or peg-shaped. Expanded plastic is a light, flexible, insulating material which cannot be used as a thermally conductive material.

At least one channel is provided in the carrying container. The channel is used as a reactant-guiding channel. At least one reactant of the fuel cell or of the fuel cell stack can be conducted through the reactant-guiding channel to the fuel cell and away from the fuel cell, in particular as a product. The product can be brought out in a depleted reagent stream.

The carrying container of expanded plastic fills most of the space so that only extremely small dead space regions are left in which flammable or explosive mixtures based on hydrogen can form. The carrying container has a cut-out at a deliberately selected point such that the cut-out is to be used as a channel. The channel guides the reactants such as oxygen-containing air, which for example can be accelerated or else pressurised, or else hydrogen. The carrying container fulfils a plurality of tasks at the same time. It serves as a shell, as an outer limit, of a channel. At the same time it is used as a fixing means for the various components of the power supply unit. Furthermore, it is used as a filling means of dead spaces so that no hydrogen can accumulate there in an uncontrolled manner. Although minimal amounts of hydrogen can still diffuse through the expanded plastic of the carrying container, critical limit values are not exceeded in the material of the carrying container. Furthermore, there are no ignition sources in the upper part of the carrying container through where the hydrogen diffuses against gravity. The carrying container encloses the fuel cell stack to be used in a form-fitting and sealing manner so that no misdirected air flows can form around the fuel cell stack.

The fuel cells of the fuel cell stack operate according to one configuration with ambient air; they use the oxygen in the ambient air. Fuel cells operate well overstoichiometrically so that an acceleration means such as a fan or a blower causes the reactants to flow, in particular with a slight overpressure of a few 100 mbar, into the cathodes of the fuel cell stack. The fuel cell stack stands transversely with respect to the reactant-guiding channel direction. The ingenious arrangement means that all the fuel cells of the fuel cell stack can be flowed through in parallel. In order that the fuel cell can likewise be supplied with virtually the same amount of air in the edge regions, uniform distribution means in the form of ridges are provided in the reactant-guiding channel. The ridges are likewise produced from the expanded plastic. The corresponding layer of the carrying container which forms the underside of the channel and different uniform distribution means are formed in one piece from the plastic. Further uniform distribution means, preferably likewise in one piece, can likewise project from the downward-pointing upper side of the channel.

The fuel cell stack is ingeniously arranged in such a manner that the cell voltages are built up uniformly over the stack and thus the potential differences at the cathode are reduced. According to one configuration, the stack is placed in the channel along the channel; an arrangement in the transverse direction is however also suitable for reasons of space.

The channel which guides the one reactant should be widened in such a manner that it can reach all the cathodes of the individual fuel cells. If the fuel cell stack extends virtually over the entire width of the carrying container, according to one configuration an initially narrow channel can assume virtually the entire width of the carrying container, widening from the edge region of the carrying container towards the centre of the carrying container. Walls are only provided at the edges, with such a wall thickness that the rigid material of the carrying container can securely support all the components. The expanded plastic can be reinforced and supported by an outer shell which covers the entire carrying container. In such an exemplary embodiment the inflow channel for guiding the reactants looks like a hand-held, foldable fan, whose individual slats are formed by the uniform distribution means which are formed in one piece.

The individual components are arranged in the carrying container in such a manner that the inflowing air can be used in a different regard. If hydrogen flows out of one of the hydrogen-guiding components such as a hydrogen reduction valve, a hydrogen isolation valve or a hydrogen duct, the medium in the channel takes the hydrogen flowing out with it at a reduced concentration. Polymer electrolyte membrane fuel cells operate ideally in a temperature range above normal ambient temperatures, for example 65° C. to 130° C. The ambient air is therefore cooler. In particular in winter, the air can be so cold that the fuel cell operation is no longer optimal. Guiding the reactants through the carrying container, which has a certain heat storage capacity, ensures that the inflow air is heated. At the same time, the air flowing in can be used as a cooling means for heat-producing components. In one configuration, individual components are placed in a securely embedded manner in the corresponding layer of the carrying container underneath the channel. The lighter hydrogen rises against gravity and diffuses in the reactant-guiding channel. The inflow to the cathodes of the fuel cell, which inflow is under slight overpressure, for example 500 mbar, reduces the concentration of the escaping hydrogen.

According to a further aspect, the reactant channel, preferably the air channel, can be used to let purged hydrogen into the air channel upstream of the fuel cell stack, in order to reduce the concentration further with the open cathode of the fuel cell stack.

The unconsumed reactants and the arising products, in particular water in gaseous form, are brought out on the other side of the respective fuel cell, that is the entire fuel cell stack, via the second part of the channel. The channel which passes through the carrying container and consists of two sections is interrupted approximately centrally by a larger cut-out which is provided for the fuel cell stack. The further components which are required for the operation of the power supply unit can be arranged underneath one of the two channel sections. The arrangement of the individual components is selected in such a manner that no ignition energy can get out of the electrical lines into a mixture of the reactants. Components which for example require a greater flow of current during operation, such as control valves, are placed in the lower, output-side region of the carrying container, whereas components with less electrical power, such as sensors, are placed in the lower, input-side region of the carrying container underneath the inflow channel section. Of course, the arrangement of the sensors can only be positionally shifted to the extent that they can be changed based on their function and nevertheless still fulfil the function.

According to a further favourable configuration, such an expanded plastic is selected which opens out into closed surface cells during the formative foaming. The surface structure on the inner side of the channel, which is a closed surface, preferably without depressions, holes or dents, ensures a reduction of the pressure drop during inflow and outflow of the reactants or reagents. Experiments have shown that such channels can be constructed with pressure drops lower than 0.25 bar. The entire pressure drop downstream of a fan as far as the outflow opening including a suitable fuel cell stack is preferably less than 0.3 bar or 0.25 bar in total. Work is preferably carried out with extremely small pressure drops, for example a value less than 20 mbar such as 10 mbar.

The channel, which is divided into two, is fanned out multiply on the input side, in order to lead to the cathodes of the individual fuel cells of the fuel cell stack. The reactant which is guided to the fuel cell cools the components over which it passes. The reactant is heated in the process. The expanded plastic is rigid in the operating range of the power supply unit, for example from −20° C. to +130° C. The expanded plastic has a heat storage capacity. Hydrogen can diffuse through the expanded plastic, but the latter reduces the migration velocity of the hydrogen.

The carrying container is foamed in individual layers. The individual layers have steps. Individual components can be inserted in a fixing manner in a layer of the carrying container. When the carrying container is populated with all the components, including the corresponding cabling between the components, the layers can be placed on top of one another in such a manner that the individual steps engage with one another, preferably in an interlocking manner. For each step there is therefore the corresponding mirror-image counter-step in the next layer. According to one configuration, at least two different levels can be identified in the carrying container. According to a further configuration, at least three different levels can be identified in the carrying container. The carrying container itself consists of only two parts in this configuration, however. According to another configuration, the carrying container can also consist of three or more layers. The layers are placed on top of one another in such a manner that they come to bear against their adjacent, next layer in both the horizontal and vertical planes, in particular in sections.

A blower on the outflow side can be arranged—viewed in terms of flow—downstream of the fuel cell stack. The blower can suck the air, the reactants, out of the cathodes of the fuel call stack in a sucking manner and take the products such as water with it in the process.

As a particular safety feature, a hydrogen sensor, a sensor which is to measure the hydrogen concentration, can be arranged downstream of the fuel cell stack and upstream of the blower. This is the location at which the highest concentration is measured in the event of damage to the membrane of a fuel cell. The hydrogen sensor is situated in the outflow which is enriched with products. According to an alternative configuration, the hydrogen sensor is to be arranged downstream of the blower. This is the point at which a good blend is ensured. This means that the relative height position in the housing is of lower priority.

If the carrying container has been provided with all the components of the fuel cell system, the carrying container can be pushed or inserted into its outer shell (for example as a unit for a "rackmount"). The resulting compact unit can have the form of a standardised housing such as a 19' system so that the carrying container can be used in the motor sport field as well as in the motor boat field or the emergency generator field. Power supply units according to the invention are easy to stack in this configuration; they can be obtained as required from a central store, in which the power supply units can be stacked up to the ceiling, or they can be easily stacked there.

The form of the carrying container incorporates a particular method which is used to reduce the hazard to users of hydrogen-based power supply units. The expanded plastic of the carrying container fills unused regions within its volume in such a manner that it at the same time protects the individual components of the fuel cell system against external influences in a rigid, temperature-stable, elastically resilient manner. The air supply for the fuel cell stack is guided to and from the respective fuel cell through a channel which is formed as a cut-out in the carrying container. Escaping hydrogen can only enter the channel in reduced quantities where its concentration is likewise further reduced. In this manner the hydrogen is released at a reduced concentration into the ambient air in a controlled manner via the product flow. Furthermore, a carrying container according to the invention allows the reactants flowing in to be heated, while individual components of the power supply unit are cooled or maintained at a suitable operating temperature by means of the reactant or reagent flow. The temperature profile is regulated within the power supply unit.

The foamed carrying container, a space-filling container which is produced from an insulating material or foam, surrounds the fuel cell stack. The carrying container forms the space. The carrying container fills the space. The carrying container defines the space. The carrying container defines the dimensions of the power supply unit. The carrying container can be delimited and covered with just a metallic or other suitable housing. The carrying container is an external construction which encloses the components. The carrying container can be referred to as a plastic enclosure. According to a further aspect, the elastic, heat-insulating carrying container can comprise further secondary cells in addition to the fuel cell stack, which secondary cells form together with the other components an autarkic, compact power supply unit which is arranged in the carrying container.

Figure 2:
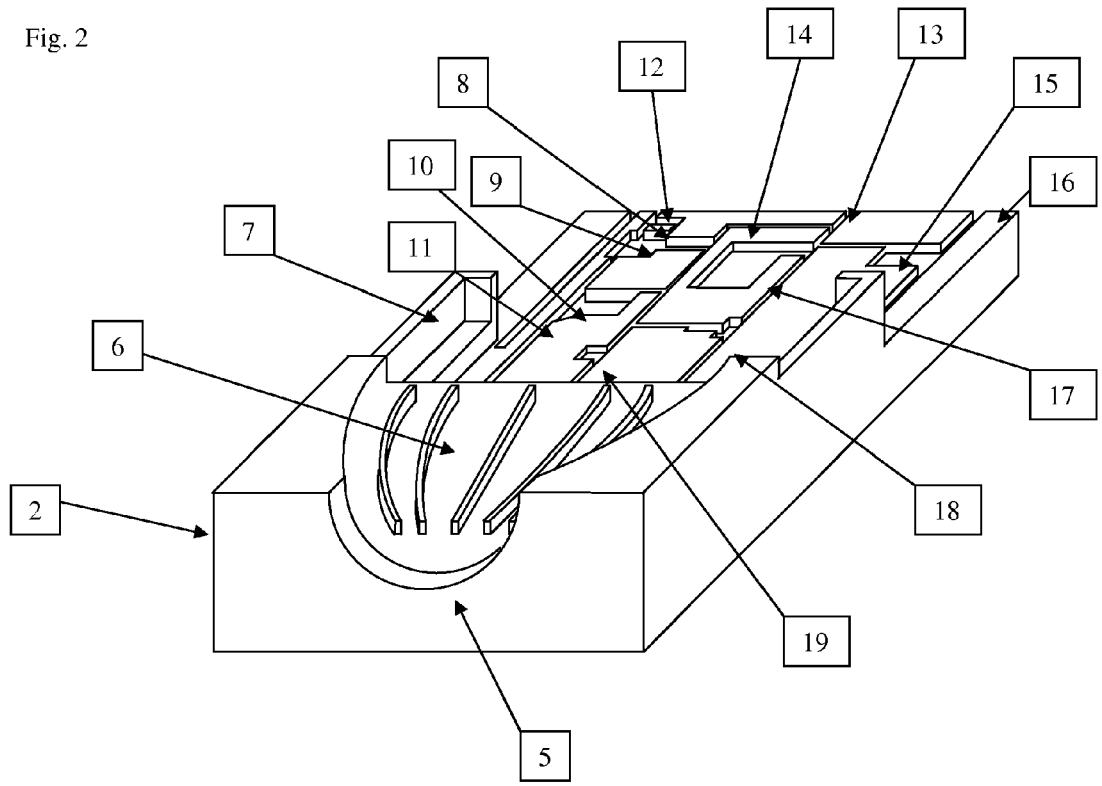
Figure 3:
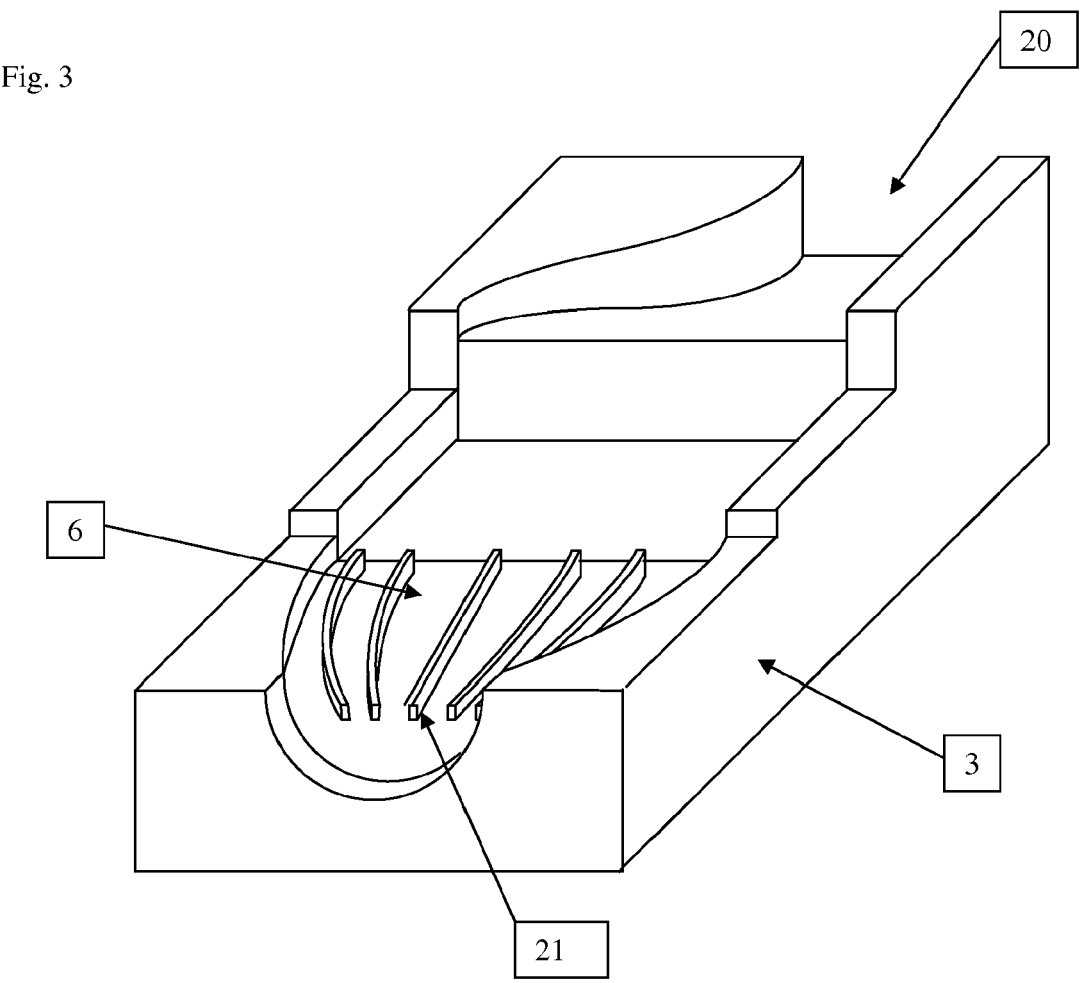
Figure 4:
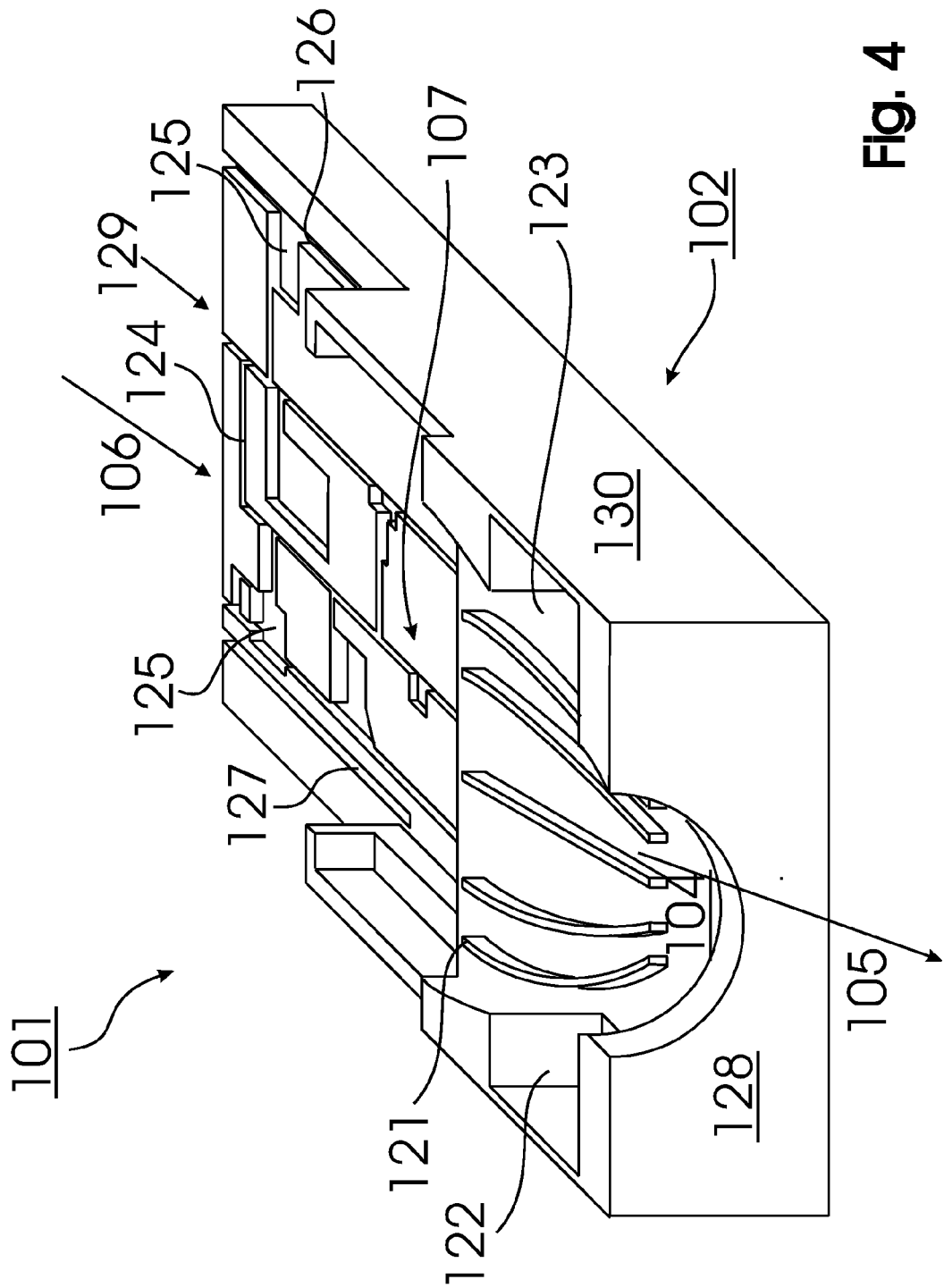

The invention can be understood even better if reference is made to the attached figures, in which FIG. 1 shows a compact power supply unit according to the invention, FIG. 2 shows the lower layer of the carrying container in a folded open form, FIG. 3 shows the upper layer of a carrying container according to the invention in a folded open form and FIG. 4 shows an alternative embodiment of a part shell of a power supply unit with additional batteries.

Viewed from outside, the power supply unit looks as shown in FIG. 1, as a monolithic block which is closed off by a housing 1. The housing 1 can be a metal shell. Alternatively, the housing 1 can be a plastic box. Other materials are also conceivable for the housing. The housing 1 is to be pulled over the lower layer 2 and the upper layer 3, which engage in one another. The housing 1 or the layers 2, 3 of expanded plastic which lie on top of one another have feed and discharge openings at suitable points. A feed opening has space for a fan 4 which sucks in the ambient air and brings it in an accelerated manner to the fuel cell in the interior of the housing 1. If the housing 1 according to FIG. 1 is folded open into its two halves, which are produced from the layers 2, 3, similar plates can be seen, as shown in FIGS. 2 and 3. The lower layer 2 and the upper layer 3 are offset in a multi-step manner. The steps correspond to each other in such a manner that the two layers 2, 3 together can form a rectangular box. The steps of the lower layer 2 and of the upper layer 3 engage in one another when put together. As a securing measure, the engagement can take place in an interlocking or other suitable locking manner. A further form of the securing means consists in the enclosing housing 1 being pulled over.

The space for selected components of the power supply unit is provided in the lowest level of the lower layer. The lower layer 2 has cut-outs in the lowest level, which cut-outs are at least partially merged to each other by connecting sections so that tubes, lines or other connecting means can be laid in them between the individual components. By way of example, FIG. 2 shows that a cut-out for a hydrogen sensor 8, a cut-out for a hydrogen isolation valve 9, a cut-out for a hydrogen pressure-reducing valve 10, a cut-out for a hydrogen duct 11, a cut-out for a connecting means such as a connecting screw fastening for a hydrogen feed line 11, a cut-out for a connection of a controller of the housing 13, a cut-out for a cable harness 14, a cut-out for electrical contacts 15 and a cut-out for power cables 16 can be available. In addition, further cut-outs can be provided, for example a cut-out for a power distribution system or a fuse 17, a cut-out for a hydrogen purge valve 18 or a cut-out for a temperature sensor 19. Components from which hydrogen can escape or components which can emit dangerous ignition energy owing to an electrical or electronic fault, can favourably be placed in the lower rear part of the lower layer 2 of the housing 1 in such a manner that the outlet 20 of the air channel can go away above them in the upper layer 3 (FIG. 3). Integrally formed uniform distribution means 21 are provided in the feed line, the air guide 6, which uniform distribution means can emerge both from the lower layer 2 and from the upper layer 3. The uniform distribution means 21 can also be subdivided so that one part forms a piece of the lower layer 2 and one part forms that of the upper layer 3. If the respective uniform distribution means 21 lie on top of one another because the two layers 2, 3 lie on top of one another, the uniform distribution means can be continuous from the lower side of the inflow channel to the upper side of the inflow channel.

On approximately half the extent of the channel 6, 20 there is a relatively large cut-out, the cut-out 7, which is meant for the fuel cell stack. The cut-out 7 runs transversely with respect to the air guide 6 and the outlet of the air channel 20. This arrangement means that the fuel cells can be flowed into laterally, and the products can flow away laterally via the outlet 20.

A further configuration of a carrying container part of a compact, portable power supply unit can be seen in FIG. 4. The housing 101 is only partially shown by the lower shell, its lowest layer 102. The whole layer 102 is produced from the same, uniform material. The lowest layer 102 is produced from expanded plastic, as are the other layers which follow it (not shown). The respective layer 102 has cut-outs 105, 107, 122, 123, 124, 125, 126, 127. It is also possible for only one layer 102 to be equipped with the numerous cut-outs. The layer 102 is shaped like a rectangular box which has an output side 128, an input side 129 and a longitudinal side 130. The output side 128 faces the observer. It projects out of the image plane. In the output side 128 there is a cut-out 105 for a blower 104 (not shown in detail). The blower 104 has a sucking function. It sucks the air out on the outflow side of the fuel cell stack which is situated in the cut-out 107 for the fuel cell stack in the layer 102. The outflow is a composition of products of the electrochemical reaction and depleted reagents. The air channel inlet 106 is located on the input side 129 of the housing 101. The air is initially guided via the air channel over components to be cooled. Such components to be cooled can be for example power semiconductors or control electronics such as control boards with microcontrollers. The power semiconductors sit in a self-retaining manner in the lower layer 102 of the housing 101 in a cut-out 124 provided for them. Batteries, which are likewise enclosed by the expanded plastic, sit in one to two further cut-outs 122, 123, as "backup" solutions for the fuel cell stack. Approximately centrally in the housing 101 there is a cut-out 107 for the fuel cell stack. The air flow direction runs transversely with respect to the extent of the fuel cell stack. Further cut-outs 125, 126, 127 are provided in the same plane as the cut-out 124 for the control board. The individual (auxiliary) components of the power supply system extend in the same plane. The components are enclosed by the expanded plastic. There are different cut-outs 125 for sensors and switches. There are also cut-outs 126 for electrical cables between the individual components; and there are cut-outs 127 for ducts, for example for hydrogen.

Polypropylene, polyurethane and polyethylene have proven suitable as materials for the expanded plastic of the carrying container. Further suitable materials for the expanded plastic must be rigid, resistant to ageing, shock-proof and temperature-equalising in the operating temperature range of the power supply unit, starting from negative temperatures up to the maximum operating temperature of the fuel cell. The above-mentioned materials constitute a favourable compromise between these requirements.

For the person skilled in the art it is understood that those designs, in which the carrying container consists not only of two layers, but also of three or four layers, or even more layers, are also included in the scope of protection of the present invention. The expanded plastic does not contribute significantly to the increase in weight of the power supply unit, but makes power supply units according to the invention, which operate with flammable reactants or reagents, more reliable. The carrying container protects the individual components which form a power supply unit as a whole and it equalises temperature fluctuations, mechanical influences and undesired operating states and hazards.

LIST OF REFERENCE SYMBOLS

1 Housing
2 Lower layer of expanded plastic
3 Upper layer of expanded plastic
4 Fan
5 Cut-out for fan
6 Air channel inlet
7 Cut-out for fuel cell stack
8 Cut-out for hydrogen pressure sensor
9 Cut-out for hydrogen isolation valve
10 Cut-out for hydrogen pressure reducer
11 Cut-out for hydrogen duct
12 Connection for hydrogen on housing
13 Connection for controller on housing
14 Cut-out for cable harness
15 Cut-out for contact
16 Connection for power cable on housing
17 Cut-out for power distribution or fuses
18 Cut-out for hydrogen purge valve
19 Cut-out for temperature sensor
20 Air channel outlet
21 Uniform distribution means
101 Housing
102 Lower layer of expanded plastic
104 Blower
105 Cut-out for blower, in particular as sucking blower
106 Air channel inlet
107 Cut-out for fuel cell stack
122 Cut-out for first battery stack
123 Cut-out for second battery stack
124 Cut-out for components to be cooled, such as control board
125 Cut-out for components of the power supply unit such as sensors, switches
126 Cut-out for cables of the power supply unit
127 Cut-out for tubes of the power supply unit
128 Housing output side
129 Housing input side
130 Housing longitudinal side

The invention claimed is:

1. Carrying container in the form of a rectangular elongated container for containing an operating compact power supply unit,
wherein said power supply unit comprises a fuel cell stack and additional components for making the fuel cell stack operable as a power supply unit, so that said power supply unit supplies power from the fuel cell stack, and
said additional components are offset with respect to each other and with respect to the fuel cell stack,
a plastic material in a state of being an expanded plastic material forms the carrying container and at least one channel is formed in the expanded plastic material, wherein the channel comprises a reactant-guiding channel and the channel forms an outflow opening which is depleted of reactants and enriched with products, and the carrying container comprises cut-outs in which individual components of said additional different components including corresponding cabling between the components are situated without further fastening measures,
wherein the fuel cell stack and additional components are disposed within the expanded plastic material of the carrying container.

2. Carrying container according to claim 1, which guides a reactant wherein said reactant is guided through the channel and the reactant is an oxygen-containing gas.

3. Carrying container according to claim 1, wherein the carrying container encloses and seals the fuel cell stack in a form-fitting manner that no air flows for cathodes of the fuel cell stack can form around the fuel cell stack.

4. Carrying container according to claim 1, wherein hydrogen-guiding components which are embedded in the carrying container are placed underneath the channel in such a manner that escaping hydrogen can diffuse against gravity into the channel and can be brought out of the carrying container in a controlled manner from there with a reduced concentration owing to the flow of reactants.

5. Carrying container according to claim 1, in which the channel has a closed surface by means of which the reactant is guided through the housing under a pressure drop which is less than 0.25 bar.

6. Carrying container according to claim 1, in which the channel is a channel which is divided into two, of which one part opens laterally on a cathode side of fuel cells of the fuel cell stack in a multiply fanned manner, which spans components to be cooled and reactant flowing in the channel thus undergoes a rise in temperature to match a reactant temperature in the direction of a fuel cell temperature level, whereas the other part spans hydrogen-guiding components so that a hazard reduction is made possible by reducing a concentration of hydrogen residues by means of a reagent from the fuel cells.

7. Carrying container according to claim 1, in which the carrying container consists of at least two layers, which, when interlocked with each other, form a block,
wherein each layer is constructed in a multi-step and mirror-image manner with respect to the steps of the corresponding layer, in order to have a lower level for a hydrogen pressure sensor, for a hydrogen isolation valve, for a hydrogen pressure-reducing valve, for a hydrogen duct and for electrical and electronic components, and in order to have a middle level for a section of the fuel cell stack, and in order to have an upper level for a reactant feed.

8. Carrying container according to claim 1, in order to convey air, a fan is situated in the carrying container on an outflow side in a region of an end of the carrying container which fan conducts a reagent, namely air, through the fuel cell stack in a sucking manner.

9. Carrying container according to claim 1, in which a hydrogen concentration sensor is situated on an outflow side downstream of the fuel cell stack in the outflow which is enriched with products in the carrying container, held by the latter.

10. Carrying container according to claim 2, in which the oxygen-containing gas is ambient air and further comprising a feed opening having space for means for causing the oxygen-containing gas to blow into the fuel cell stack.

11. Carrying container according to claim 10, in which the ambient air is pressurised, and the reactant is conducted by guiding ridges which conduct the flowing reactants into cathodes of fuel cells which are assembled to form the fuel cell stack.

12. Carrying container according to claim 1, for which the expanded plastic material is chosen from a group of plastic material, the group consisting of expanded polypropylene, expanded polyurethane or expanded polyethylene.

13. Carrying container according to claim 1, wherein the carrying container encloses and seals the fuel cell stack to be used as a power source of the power supply unit in a form-fitting manner that no air flows within the carrying container can form around the fuel cell stack.

14. Carrying container according to claim 1, wherein:
at least one cut-out of the carrying container houses only one individual component.

15. Carrying container according to claim 1, wherein the carrying container comprises at least two individual expanded plastic layers, wherein the individual components, including the corresponding cabling between the components, are disposed in the layers and wherein the layers are placed on top of one another to form a rectangular box.

16. Carrying container according to claim 15, wherein the two layers are offset in a stepped manner, and the steps of the two layers correspond to each other in such a manner that the two layers engage in one another when put together.

17. Carrying container enclosing a compact power supply unit, wherein
said power supply unit comprises a fuel cell stack and additional components for making the fuel cell stack operable as a power supply unit, so that said power supply unit supplies power from the fuel cell stack, said additional components are offset with respect to each other within the carrying container,
the carrying container comprises an expanded plastic material and at least one channel is formed in the expanded plastic material, wherein the channel comprises a reactant-guiding channel,
cabling between the additional components disposed in the carrying container,
wherein selected ones of the additional components requiring a greater flow of current during operation are placed in a lower, output-side region of the carrying container and selected ones of the different components requiring a lesser flow of electrical current during operation are placed in an input-side region of the carrying container underneath an inflow channel section,
wherein the carrying container comprises at least two individual layers, and the layers have steps and are placed on top of one another to form the carrying container.

18. A carrying container for an operating power supply unit with fuel cells, comprising:
a lower layer of plastic in a state of being expanded plastic;
an upper layer of plastic in a state of being expanded plastic; and
a housing enclosing the lower and upper layers;
wherein the upper layer is disposed on top of the lower layer and opposing surfaces of the lower and upper layers are stepped and offset, in a multi-step manner, and engage one another when put together;
wherein the lower layer has a first cut-out for a fuel cell stack and second cut-outs for other components of the power supply unit, wherein the cut-outs are at least partially merged to each other by connecting sections so that connecting means can be laid in the cut-outs between selected ones of the other components;
further comprising:
an air channel inlet formed in at least one of the lower and upper layers having a fan for sucking in ambient air from outside the housing to the interior of the housing; and
an air channel outlet formed in at least one of the lower and upper layers comprising an air guide emerging from said at least one of the lower and upper layers.

19. Carrying container according to claim 11, wherein a segment of the channel which is located directly upstream of at least one fuel cell of the fuel cell stack reaches from one side of the carrying container to an opposite side of the carrying container.

* * * * *